United States Patent [19]
Fromm et al.

[11] 4,326,298
[45] Apr. 20, 1982

[54] ARRANGEMENT FOR SIGNALING IN A VOICE COMMUNICATION SYSTEM WITH OPTICALLY FED COMPONENTS

[75] Inventors: Ingrid Fromm; Helmut Lagger, both of Munich, Fed. Rep. of Germany

[73] Assignee: Siemens Aktiengesellschaft, Berlin & Munich, Fed. Rep. of Germany

[21] Appl. No.: 169,448

[22] Filed: Jul. 16, 1980

[30] Foreign Application Priority Data

Sep. 5, 1979 [DE] Fed. Rep. of Germany ....... 2935838

[51] Int. Cl.$^3$ .............................................. H04B 9/00
[52] U.S. Cl. .................................. 455/606; 455/607; 455/612; 455/617
[58] Field of Search ................ 455/600, 603, 605, 606, 455/610, 612, 614, 617, 607

[56] References Cited

FOREIGN PATENT DOCUMENTS

2708606 8/1978 Fed. Rep. of Germany .

OTHER PUBLICATIONS

Rosenberger D., "Microoptic Passive Devices for Multimode Optical Fiber Communication Systems", Siemens Forsch–U. Entwickl.–Ber. Bd. 8, (1979) No. 3, Springer–Verlag 1979.
Winzer G., "Tapping Elements with Thin–Film Beam Splitters Directly Appl. To Optical Fiber Endfaces", Siemens Forsch–U. Entwickl.–Ber. Bd. 8, (1979), No. 1, Springer–Verlag 1979.
Winzele et al., "Reed–Type Route Switching for Multimode Optical Fibers", Siemens Forsch–U. Entwickl.–Ber. Bd. 8, (1979) No. 3, Springer-Verlag 1979.

*Primary Examiner*—Howard Britton
*Attorney, Agent, or Firm*—Hill, Van Santen, Steadman, Chiara & Simpson

[57] ABSTRACT

An arrangement for signaling in a voice communication system having optically fed components employs light wave guides which, in addition to serving for the transmission of the communication signals, also serve for the communication of the signals required for completing and disconnecting connections and for the transmission of energy in the form of light for the energy supply of the subscriber stations. The energy for supplying the subscriber stations is transmitted in the form of unmodulated light. The frequency of the unmodulated light deviates from the fundamental frequency of the light signal transmitted from the switching center to the subscriber station. A diplexer is arranged at the subscriber station for the incoming light and conducts the incoming modulated light to a loudspeaker by way of an optical transfer switch and an optoelectronic transducer and feeds the unmodulated light to an acousto optical modulator. In the switching center, apparatus is provided for periodically interrogating all subscriber stations with short light pulses as to their operating conditions. First and second optical transfer switches are provided in the subscriber substations and are indirectly synchronously actuatable by the subscriber, preferably by the handset. The short light pulses are absorbed by an optoelectronic transducer in the idle condition of the subscriber station and are at least partially reflected by an acousto-optical modulator in the activated condition for an outgoing call. In the case of an incoming connection, continuous light or continuous light pulsed in the call rhythm, of two frequencies is transmitted to the subscriber station for activating the call element. The short light pulses for interrogating the operating condition are dimensioned in terms of pulse length and in terms of pulse-to-pause ratio in such a manner that, on the one hand, the call element is not activated and, on the other hand, no noticeable delay of the completion of an outgoing connection occurs.

12 Claims, 2 Drawing Figures

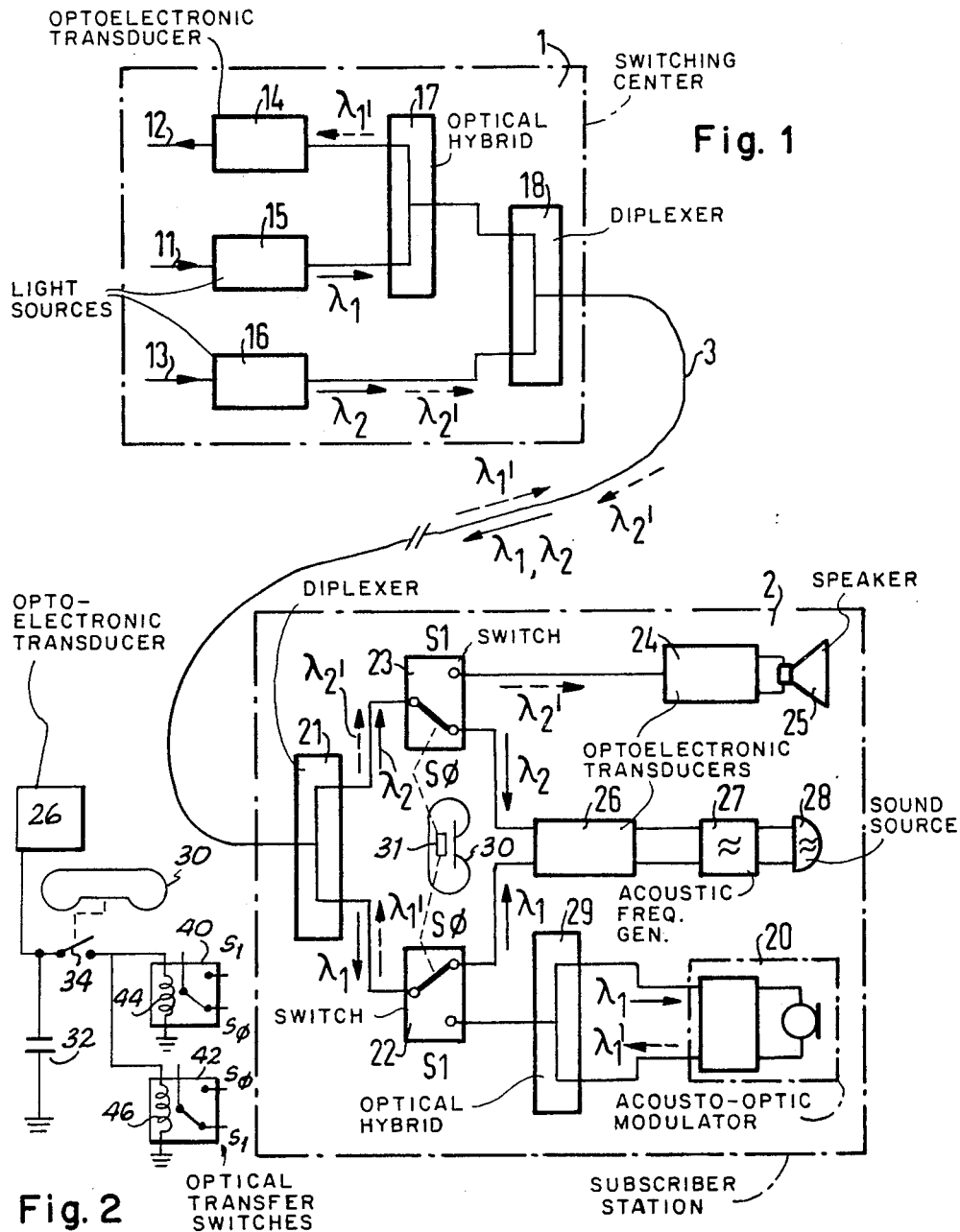

ARRANGEMENT FOR SIGNALING IN A VOICE COMMUNICATION SYSTEM WITH OPTICALLY FED COMPONENTS

BACKGROUND OF THE INVENTION

1. Field of the Invention

The present invention relates to an arrangement for signaling in a voice communication system with optically fed components in which the light wave guides, in addition to the transmission of the communications signals, also serve for the transmission of the signals required for the connection and disconnection, as well as for the transmission of energy in the form of light for the energy supply of the subscriber station.

2. Description of the Prior Art

In recent years, light wave guides consisting of optical fibers have been developed which permit broad band signals to be transmitted with relatively low attenuation. These properties make light wave guides particularly suited for employment in upper network levels of telephone systems in which a greater plurality of telephone signals are simultaneously transmitted on a time division multiplex basis or on a frequency division multiplex basis. If the transmission lines in upper network levels are constructed of light wave guides, the employment of light wave guides in the lower network levels up to the individual subscriber stations also gains in interest, if only for reasons of employing a uniform transmission technology. This is particularly true when a need for higher frequency band width also exists for the subscriber stations than can be made available by the standard, electric telephone subscriber lines.

A communications system is known from the German published application No. 2,708,606 in which there is provided on the subscriber side an optical hookswitch and a further optical selective switch with whose assistance by different actuations of the switches a plurality of operating states of the subscriber station can be set, in particular, the preparedness state for the reception of an incoming call, the conversation state in which both incoming communications signals are supplied to an opto-acoustical transducer and outgoing communication signals are supplied to an acousto-optical modulator, and the signaling state in which dial information input by the subscriber is converted into corresponding optical signals and transmitted to a switching center. In addition to the optical transfer switches, an optical hybrid, an optical coupling point and an optical diplexer are required for the subscriber station of the known communication system in order to fulfill these functions.

SUMMARY OF THE INVENTION

The object of the present invention is to provide an arrangement for signaling in a voice communication system having optically fed components in which the light wave guides, in addition to the transmission of communication signals, also serve for the transmission of the signals required for completing the connection and for the transmission of energy in the form of light energy for supplying the subscriber station, in which the control-engineering expense on the side of the subscriber station is reduced in comparison to the known communication system, and in which optical transfer switches required for the reversal of the optical paths within the station are provided which are actuated in exactly the same manner, so that a simple function of the switches matching the function of traditional telephone stations is rendered possible.

The above object is achieved, according to the present invention, in an arrangement for signaling in a voice communication system with optically fed components in which the light wave guides, in addition to serving for the transmission of the communication signals, also serve for the transmission of the signals required for completing and disconnecting the connection and for the transmission of energy in the form of light for the energy supply of the subscriber station, in which the energy for supplying the subscriber station is transmitted in the form of unmodulated light, in which the frequency of the transmitted unmodulated light deviates from the fundamental frequency of the light signal transmitted from the switching center to the subscriber station and in which a diplexer is arranged in the subscriber station for the light arriving from the switching center, the diplexer feeding the incoming, modulated light to a loud speaker by way of an optical transfer switch and an opto-electronic transducer and feeding the unmodulated light to an acousto-optic modulator.

The arrangement constructed in accordance with the present invention is particularly characterized in that all of the subscriber stations connected to the switching center are periodically interrogated as to their operating state with short light pulses transmitted from the switching center. A first optical transfer switch and a second optical transfer switch are provided in the subscriber station which can be indirectly, synchronously actuated by the subscriber. The short light pulses are absorbed by an optoelectronic transducer in the idle condition of the subscriber station and are at least partially reflected by an acousto-optic modulator in the condition activated for an outgoing call. In the case of an incoming connection, continuous light or continuous light pulsed in the call rhythm of both frequencies is transmitted to the subscriber station for activating a call signaling element. The short light pulses for sampling the operating condition are dimensioned with respect to pulse length and with respect to pulse-to-pause ratio in such a manner that, on the one hand, the call signaling element is not activated and, on the other hand, no noticeable delay of the outgoing completion of connection occurs.

The present invention offers the advantage that the operational cycles in the subscriber station corresponds to those of a traditional, exclusively electrically supplied subscriber station and, therefore, no deviant operating manipulations are required. In addition, it is advantageous that, for the interrogation of a subscriber station connected to the switching center, short light pulses individually assigned need only be transmitted from a central station to the subscriber stations in a time pattern, so that a multitude of subscriber stations can be interrogated from a single light source.

A further development of the invention provides that, proceeding from the switching center via a light wave guide, short light pulses of an unmodulated light of a first frequency are periodically fed from a first light source via a diplexer and a first optical transverse switch for interrogating a connection request. In the idle condition of the subscriber station, in particular, when the receiver is on the hook, the short light pulses arrive by way of the transfer idle position to a first optoelectronic transducer at the subscriber station where they are absorbed or, in the working condition, in particular, when the receiver is off the hook, they arrive at an acousto-optic modulator by way of the transfer work position and an optical hybrid at the subscriber station, from which acousto-optic modulator the pulses are reflected. The reflected, short light pulses can be supplied to an optoelectronic transducer at the exchange by way of a diplexer and an optical hybrid, the optoelectronic transducer emitting corresponding electric pulses by way of a second coupling line to an appertaining evaluation circuit within the switching center. In the call condition, continuously unmodulated light of the first frequency and continuously unmodulated light of a second frequency from a second light source are fed to the first optoelectronic transducer at the subscriber station by way of an exchange diplexer, the light wave guide, a subscriber diplexer, and the first and second optical transfer switches via their respective transfer idle positions. An acoustic frequency generator with a source of sound is connected to the first optoelectronic transducer in the subscriber station. The acoustic frequency generator and the source of sound are activated due to the light power supply. When the handset is picked up, the first optical transfer switch and the second optical transfer switch are placed in the respective transfer work positions so that the unmodulated light of the first frequency can be converted by the acousto-optic modulator into modulated light of the first frequency and modulated light of the second frequency can be converted into electrical signals by a second optoelectronic transducer in the subscriber station so that a loudspeaker which is connected to the second optoelectronic transducer generates acoustic signals corresponding to the optical communication signal supplied.

The above further development of the invention offers the advantage that a relatively low component expense is respectively required both in the subscriber stations and in the appertaining switching center.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a schematic circuit diagram of a switching center and a subscriber station constructed in accordance with the present invention; and FIG. 2 illustrates a variation of the structure of the subscriber station of FIG. 1.

DESCRIPTION OF THE PREFERRED EMBODIMENTS

Referring to the upper portion of the drawing, the essential elements of the invention within a switching center 1 constructed in accordance with the invention are illustrated as comprising a first coupling line 11, a second coupling line 12, a third coupling line 13, a switching center opto-electronic transducer 14, a first light source 15, a second light source 16, a switching center optical hybrid 17, and a switching center diplexer 18. The switching center 1 is connected to a subscriber station 2 in the lower portion of the drawing by way of a light wave guide 3.

Referring to the lower part of the drawing, an exemplary embodiment of a subscriber station 2 constructed in accordance with the present invention is illustrated showing all the essential elements for practicing the invention. The subscriber station 2 comprises, in particular, a subscriber diplexer 21, a first optical transfer switch 22, a second optical transfer switch 23, a first subscriber opto electronic transducer 26, a second subscriber opto electronic transducer 24, a loudspeaker 25, an acoustic frequency generator 27, a source of sound 28, a subscriber optical hybrid 29 and an acousto-optic modulator 20.

In the exemplary embodiment of the invention illustrated, the first optical transfer switch 22 and the second optical transfer switch 23 are realized as monostable, magnetically actuatable fiber switches known per se according to the Reed relay principle, cf. for example, Siemens Forschungs-und Entwicklungsberichte, Vol. 8, (1979), No. 3, Springer-Verlag 1979: "*Reed-Type Routing Switch for Multimode Optical Fibers*" by G. Winzer, E. Grassl, M. Stockmann and R. Fiereder. The optical hybrids 17 and 19, as well as the diplexers 18 and 21, are likewise known per se, cf. for example, Siemens Forschungs-und Entwicklungsberichte, Vol. 8 (1979) No. 1, Springer-Verlag 1979: "*Tapping Elements with Thin Film Beam Splitters Directly Applied to Optical Fiber Endfaces,*" by G. Winzer and Siemens Forschungs-und Entwicklungsberichte, Vol. 8 (1979), No. 3, Springer-Verlag, 1979: "*Microoptic Passive Devices for Multimode Optical Fiber Communication Systems*" by D. Rosenberger.

CALL SIGNALING MODE

A first light source 15 and a second light source 16 are permanently allocated, or assigned, to each of the subscriber stations in the switching center 1. In the idle condition of the subscriber station 2, these light sources are activated by signals on the respective coupling lines 11, 13 to transmit an unmodulated light of a first frequency $\lambda_1$ and an unmodulated light of a second frequency $\lambda_2$, respectively, by way of the hybrid 17 and the diplexer 18, over the light wave guide 3, to the subscriber station 2. The two frequencies are received by the subscriber diplexer 21 and are fed, respectively, via the optical transfer switches 22 and 23 in the idle positions $S\phi$ to the first optoelectronic transducer 26. The light energy supplied in this manner is converted into electrical energy in the optoelectronic transducer 26 in a known manner, in particular, by means of a photoelement. An acoustic frequency generator 27 which, preferably, is realized as a low-loss multivibrator, is connected to the output of the optoelectronic transducer. A source of sound 28 is connected to the acoustic frequency generator 27, the source of sound 28 being preferably designed as a piezoceramic plate which is excited to oscillate by the electric signals emitted by the multivibrator. Thereby, an acoustic signal arises which is amplified by means of a resonant body, known per se, to form a call tone (ringing). Since both light sources 15 and 16 are exploited for generating the call zone, a relatively large light power and, therefore, indirectly, a relatively large sound volume are advantageously available.

A lifting of the handset to the offhook condition causes the two optical transfer switches 22 and 23 to be placed into their respective transfer work positions S1. To this end, according to an exemplary embodiment of the invention for the subscriber station 2, a handset containing the acousto-optical modulator 20 functioning as the transmitter of the telephone and the loudspeaker 25 functioning as the receiver of the telephone is provided, a permanent magnet 25 of suitable field strength being arranged in the grasping area of the handset 30 in such a manner that the first optical transfer switch 22 and the second optical transfer switch 23 are to be respectively brought into the transfer idle position Sϕ when the handset is on hook and into the transfer work position S1 when the handset is lifted to provide an off-set hook condition. Another exemplary embodiment of the invention provides that the first optical transfer switch 40 and the second optical transfer switch 42 are constructed as bistable, electromagnetically actuatable fiber switches. For actuating the first optical transfer switch 40 and the second optical transfer switch 42, electrical energy in the form of a capacitor charge can be taken by a capacitor 32; from the optoelectronic transducer 26 and when the handset 36 is picked up or, respectively, set down, the capacitor charge directly or indirectly flows by way of a hookswitch contact 34 known per se, into the respective actuation coils 44, 46 of the first optical transfer switch 46 and of the second optical transfer switch 42, so that the first optical transfer switch 40 and the second optical transfer switch 42 can be respectively brought into the transfer idle position Sϕ when the handset is hung up or can be brought into the transfer work position S1 when the handset is picked up. In all of these embodiments, actuation of the transfer switches to the working position S1 disconnects the transducer 26 and terminates ringing.

VOICE COMMUNICATION MODE

With the optical transfer switches 22, 23 in their working positions S1, the acousto optical modulator 20 operating as the telephone transmitter and the loudspeaker 25 operating as a telephone receiver, the latter being connected to a second opto electronic transducer 24, are connected to the two light sources 15 and 16. In a manner known per se, the acousto-optical modulator 20 modulates the incoming unmodulated light of the first frequency $\lambda_1$ and retransmits it as modulated light of a first frequency $\lambda_1'$. An optical hybrid 29 is provided at the subscriber station so that the unmodulated light of the first frequency $\lambda_1$ arrives at the input of the acousto-optical modulator 20 and the modulated light of the first frequency $\lambda_1'$ arrives from the output of the acousto-optical modulator 20 and is transmitted back to the switching center 1. Proceeding from the switching center 1, the light of the second light source 16 is now transmitted to the subscriber station 2 as modulated light of a second frequency $\lambda_2'$, the light arriving at the subscriber station by way of the transfer work position S1 of the second optical transfer switch 23 to the second opto electronic transducer 24 which converts the optical signals into corresponding electrical signals for the loudspeaker 25 in a manner known per se, in particular, by means of a photo element.

It is provided that the two light sources 15, 16 emit coherent light by means of a laser diode LD respectively provided for that purpose. Another exemplary embodiment provides that the two light sources 15 and 16 emit incoherent light by means of light emitting diodes LED.

DIALING MODE

Structure is provided in the subscriber station 2 for completing outgoing connections by means of which dialed information can be emitted in that the modulated light of the first frequency $\lambda_1'$ is converted into light pulses corresponding to the traditional electric dial pulses. For this purpose, the light beam of the unmodulated light of the first frequency $\lambda_1$ is preferably interrupted in accordance with the light pulses to be emitted by means of a perforate disc mechanically connected to a so-called dial disc (dial finger wheel). A switching center optical hybrid 17 is provided in the switching center 1, by means of which unmodulated light of the first frequency $\lambda_1$ is fed from the first light source 15 to the subscriber station 2 and modulated light of the first frequency $\lambda_1'$ arriving from the subscriber station 2 is fed to an optoelectronic transducer 14 which is preferably realized as a photodiode. The optoelectronic transducer 14 is connected by way of a second coupling line 12 to subsequently connected exchange-oriented devices within the switching center 1 for evaluating the dial pulses. Likewise, the first light source 15 and the second light source 16 are connected by way of the coupling lines 11 and 13 to other exchange-oriented devices within the switching center for control of the activation thereof.

Although we have described our invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

We claim:

1. In a voice communication system of the type in which a switching center is connected to a plurality of subscriber stations via light wave guides for carrying modulated and unmodulated light signals for completing and disconnecting calls, for energy supply of the subscriber stations by way of unmodulated light of a frequency different from the light transmitted for other purposes, the improvement therein comprising:

light generating means including interrogation means in the switching center for transmitting short light pulses to the subscriber stations;

a subscriber station diplexer;

first and second optical transfer switches connected to said diplexer for receiving respective light frequencies and each having an idle position and a working position;

handset means coupled to operate said optical transfer switches to said positions corresponding to on-hook and off-hook conditions; a call signal device; and an optoelectronic transducer connected between said idle positions of said optical transfer switches and said call signal device, said optoelectronic transducer operable to absorb short light pulses in the idle condition;

acousto optical modulator means connected to said working position of said first optical transfer switch operable in the off-hook condition to partially reflect short light pulses back toward the switching center; and dialing means for transmitting light dialing pulses to said switching center for establishing connections;

the short light pulses dimensioned with respect to pulse length and pulse-to-pause ratio such that the optoelectronic transducer cannot respond to operate said call signal device and such that a noticeable delay in completing outgoing connections does not occur.

2. The improved system of claim 1, wherein said light generating means comprises:
   means for emitting coherent light of the first and second frequencies.

3. The improved system of claim 2, wherein said means for emitting coherent light comprises:
   laser diodes.

4. The improved system of claim 1, wherein said light generating means comprises:
   means for emitting incoherent light of the first and second frequencies.

5. The improved system of claim 4, wherein said means for emitting incoherent light comprises:
   light emitting diodes.

6. An improved subscriber station for connection to a light wave guide for receiving unmodulated light of first and second frequencies, short light pulses of the first frequency and modulated light of the second frequency and transmitting modulated light of the first frequency, comprising:
   a subscriber-operated switch operable to conditions representing on-hook and off-hook conditions;
   first and second optical transfer switches each including an idle position and a work position respectively corresponding to on-hook and off-hook conditions and coupled to and operated to said positions by said subscriber-operated switch;
   a diplexer for connection to a light wave guide and connected to said first and second optical transfer switches for feeding light of the first frequency via said first optical transfer switch and light of the second frequency via said second optical transfer switch;
   ringing means connected to said idle positions of said first and second optical transfer switches and responsive to at least one of the first and second unmodulated frequencies to produce a ringing signal, and operable to reflect the short light pulses;
   receiver means connected to said working position of said second optical transfer switch and responsive to convert modulated light of the second frequency into corresponding acoustical signals; and
   transmitter means connected to said working position of said first optical transfer switch and operable to convert acoustic signals into modulated light signals of the first frequency when said first optical transfer switch is in the working position for transmission to the switching center and to at least partially reflect short pulse light signals.

7. The subscriber station of claim 6, wherein said ringing means comprises:
   an optoelectronic transducer connected to said idle positions of said first and second optical transfer switches;
   a signal generator connected to and operated by said optoelectronic transducer; and
   a source of sound connected to and activated by said signal generator.

8. The subscriber station of claim 7, wherein said source of sound comprises:
   a piezoceramic ringer.

9. The subscriber station of claim 6, wherein said receiver means comprises:
   an optoelectronic transducer connected to said working position of said second optical transfer switch; and
   a loud speaker connected to and driven by said optoelectronic transducer.

10. The subscriber station of claim 6, wherein said transmitter means comprises:
    an optical hybrid including a first input connected to said working position of said first optical transfer switch, a second input and an output; and
    acousto optical modulator means connected to said second input and to said output of said optical hybrid for receiving and modulating the light of the first frequency.

11. The subscriber station of claim 6, and further comprising:
    a handset containing said transmitter means and said receiver means; and
    a permanent magnet in said handset,
    and wherein said first and second optical transfer switches each comprise a monostable magnetically-actuatable fiber switch operated by said magnet.

12. The subscriber station of claim 6, and further comprising:
    an optoelectronic transducer connected to said first and second optical transfer switches;
    a capacitor connected to and charged by said optoelectronic transducer; and
    hookswitch contacts connected to said capacitor and to said first and second optical transfer switches,
    said optical transfer switches operated by the charge on said capacitor via said hookswitch contacts to the off-hook and on-hook conditions.

* * * * *